United States Patent
Lang et al.

(10) Patent No.: US 7,458,709 B2
(45) Date of Patent: Dec. 2, 2008

(54) METHOD FOR MOUNTING A SURFACE LIGHTING SYSTEM AND SURFACE LIGHTING SYSTEM

(75) Inventors: Kurt-Jürgen Lang, Regen (DE); Hubert Ott, Bad Abbach (DE); Ludwig Plotz, Arnschwang (DE); Christian Poh, Donaustauf (DE); Mario Wanninger, Harting (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 11/597,600
(22) PCT Filed: May 12, 2005
(86) PCT No.: PCT/DE2005/000875
§ 371 (c)(1),
(2), (4) Date: May 14, 2007
(87) PCT Pub. No.: WO2005/114273
PCT Pub. Date: Dec. 1, 2005

(65) Prior Publication Data
US 2007/0247869 A1    Oct. 25, 2007

(30) Foreign Application Priority Data
May 24, 2004  (DE) .................. 10 2004 025 414
Sep. 24, 2004  (DE) .................. 10 2004 046 696

(51) Int. Cl.
*F21V 7/04*  (2006.01)
*G02F 1/00*  (2006.01)
(52) U.S. Cl. ................... 362/612; 362/613; 362/26; 362/631; 349/65; 349/152
(58) Field of Classification Search ......... 362/612–613, 362/26–27, 603, 631, 278, 250; 349/65, 349/152
See application file for complete search history.

(56) References Cited

U.S. PATENT DOCUMENTS 5,889,568 A * 3/1999 Seraphim et al. .............. 349/73

(Continued)

FOREIGN PATENT DOCUMENTS

DE        3320953      12/1984

(Continued)

OTHER PUBLICATIONS

*Examination Report*, Taiwan Application Serial No. 94116485, Sep. 21, 2007.
Authorized officer: Frisch, A., *International Search Report*, PCT/DE2005/000875, Sep. 27, 2005.

*Primary Examiner*—Ali Alavi
(74) *Attorney, Agent, or Firm*—Fish & Richardson P.C.

(57) ABSTRACT

In a method of assembling a surface illumination system having an electromagnetic radiation emitting front side, at least one primary radiation source suitable for emitting electromagnetic radiation when operating is disposed on at least one mounting area of a flexible carrier. The flexible carrier has a front side and a back side opposite said front side, the front side of the flexible carrier defines a reference plane. The mounting area of the flexible carrier on which the primary radiation source is disposed is then bent out of the reference plane such that an optical axis of the primary radiation source extends parallel or obliquely to the reference plane. In a further step, at least one light-conducting guide having a radiation emitting front side and at least one incoupling region is disposed on the flexible printed circuit board so that in operation, the primary radiation source emits radiation into the incoupling region of the light guide and the radiation emitting front side of the light guide points in the direction of the radiation emitting front side of the surface illumination system. A corresponding surface illumination system is also described.

18 Claims, 5 Drawing Sheets

U.S. PATENT DOCUMENTS

| | | |
|---|---|---|
| 6,241,358 B1 | 6/2001 | Higuchi et al. |
| 6,502,968 B1 | 1/2003 | Simon |
| 6,646,367 B2 | 11/2003 | Makhov |
| 6,697,130 B2 | 2/2004 | Weindorf et al. |
| 6,848,819 B1 | 2/2005 | Arndt et al. |
| 7,202,920 B2 * | 4/2007 | Aoyagi et al. ............... 349/62 |
| 7,255,470 B2 * | 8/2007 | Lee et al. ................. 362/614 |
| 7,319,498 B2 * | 1/2008 | Sakurai et al. .............. 349/58 |
| 2002/0093603 A1 | 7/2002 | Chen |
| 2002/0130985 A1 | 9/2002 | Weindorf et al. |
| 2003/0067577 A1 | 4/2003 | Yamada |

FOREIGN PATENT DOCUMENTS

| | | |
|---|---|---|
| DE | 19951865 | 8/2000 |
| JP | 2004127220 | 4/2004 |
| WO | WO 00/69000 | 11/2000 |

* cited by examiner

METHOD FOR MOUNTING A SURFACE LIGHTING SYSTEM AND SURFACE LIGHTING SYSTEM

CROSS-REFERENCE TO RELATED APPLICATIONS

This application is the National Stage of International Application No. PCT/DE2005/000875, filed on May 12, 2005, which claims the priority to German Patent Applications Ser. No. 10 2004025414.1, filed on May 24, 2004 and Ser. No. 102004046696.3, filed on Sep. 24, 2004. The contents of all applications are hereby incorporated by reference in their entireties.

FIELD OF THE INVENTION

The invention relates to a method of assembling a surface illumination system and a surface illumination system.

BACKGROUND OF THE INVENTION

Surface illumination systems have a wide variety of applications. They can, for example, serve as illuminants in lamps or design systems. In particular, surface illumination systems can be used to backlight displays such as liquid crystal displays (LCDs).

Known from U.S. Pat. No. 6,646,367 B2 and U.S. Pat. No. 6,241,358 B1, for example, are surface illumination systems that can be constructed in cascade form from a plurality of light guides with primary radiation sources coupled into each of them laterally. However, the documents do not disclose any assembly concepts for making surface illumination systems of this kind.

SUMMARY OF THE INVENTION

The object of the present invention is to specify an improved and technically simple method of assembling a surface illumination system and such a surface illumination system.

A method of assembling a surface illumination system having an electromagnetic radiation emitting front side comprises the steps of:
mounting at least one primary radiation source, suitable for emitting electromagnetic radiation when operating, on at least one mounting area of a flexible carrier having a front side and a back side opposite the front side, it being the case that the front side of the flexible carrier defines a reference plane,
bending the mounting area of the flexible carrier out of the reference plane such that an optical axis of the primary radiation source extends parallel or obliquely to the reference plane,
mounting the flexible carrier on a rigid carrier with the back side of the flexible carrier facing the rigid carrier, and
mounting at least one light-conducting guide having a radiation emitting front side and at least one incoupling region on the flexible carrier in such fashion that when the surface illumination system is operating, the primary radiation source emits radiation into the incoupling region of the light guide and the radiation emitting front side of the light guide points in the direction of the radiation emitting front side of the surface illumination system.

If the primary radiation source is mounted on the mounting area of a flexible carrier, the primary radiation source can easily be brought into the desired position for coupling into the light guide merely by bending the mounting area. The mounting area is preferably located in the edge region of the flexible carrier, so a narrow region of the flexible carrier is bent upward.

The method is particularly suitable for assembling surface illumination system comprising plural light guides into each of which one or more primary radiation sources are coupled. To this end, a light guide and the primary radiation sources provided to emit radiation into the incoupling region of the light guide can be mounted on a respective flexible carrier. This arrangement substantially forms a lighting tile. A lighting tile can also include still further elements, such as for example optically active elements for purposefully distributing the radiation within the light guide and for purposefully influencing the radiation characteristic of the surface illumination system.

Furthermore, a lighting tile may include for example electronic components and conductive traces for driving the primary radiation sources or the surface illumination system, and cooling bodies.

The lighting tiles are mounted on the rigid carrier and form the base frame for a surface illumination system. The rigid carrier can be for example a display back wall. By virtue of the modular construction of the surface illumination system, composed of plural lighting tiles each of which can be individually supplied with light from primary radiation sources, it is possible to make displays of nearly any desired size and diverse geometries while at the same time maintaining an extremely uniform radiation characteristic.

It should be noted at this point that the steps of the method need not be performed in the order set down. For example, the light guide can be mounted on the rigid carrier before or after the mounting of the flexible carrier. Which embodiment of the method is advantageous depends for example on the individual assembly process and the way in which that process is carried out.

In a particularly preferred embodiment of the method, electronic components, conductive traces and/or cooling bodies are mounted on the flexible carrier. For one thing, this makes it easy to accommodate driver modules and other electronic modules for driving the primary radiation source, as well as the surface illumination system as a whole. For another, the mounting of cooling bodies, such as for example a thin metal strip, on the flexible carrier makes it possible to dissipate heat developed during the operation of the surface illumination system. Particularly preferably, cooling bodies are placed such that they can carry off the heat developed during the operation of the primary radiation source. This embodiment makes it possible in particular to give the surface lighting system an especially compact and light construction.

Further particularly preferably, a flexible printed circuit board is used as the flexible carrier. This has the advantage that the electronic components and conductive traces can easily be integrated. Thus, for example surface-mountable electronic components can be glued or soldered onto the printed circuit board provided with printed conductive traces.

In a further preferred embodiment of the method, by slitting the flexible carrier, at least one mounting area is created in which, to begin with, the primary radiation source can be mounted. In a further subsequent step, this mounting area is bent out of the reference plane such that the primary radiation source emits radiation into the incoupling region of a light guide which is placed on the flexible carrier before or after the bending of the mounting area.

The slitting of the flexible carrier is preferably done by punching.

In this embodiment, preferably plural mounting areas, such as for example narrow strips, are created in the flexible carrier. At least one primary radiation source can then be attached to each of these mounting areas. After the attachment of the primary radiation sources, the mounting areas are bent out of the reference plane, so that each primary radiation source is again in the desired position to emit radiation into its respective light guide.

In this embodiment, the functional parts of a lighting tile, such as for example the light guide with its associated primary radiation source(s), cooling body or bodies and other electronic components, are not each mounted on a separate flexible carrier, but rather, functional parts of plural lighting tiles are mounted on a single common flexible carrier. In particular, all the light guides and all the primary radiation sources of a surface illumination system can be mounted on a single common flexible carrier.

This has the advantage of minimizing the number of electronic components needed to drive the primary radiation sources. Furthermore, it eliminates the need for electrical connection sites between the individual flexible carriers.

In a further preferred embodiment of the method, structures are created on the rigid carrier for use in bending the mounting area of the flexible carrier out of the reference plane into the desired position when the flexible carrier is placed on the rigid carrier. This embodiment of the method has advantages from a process engineering standpoint and thereby facilitates the reduction to practice of the method.

In a further preferred embodiment of the method, a light-emitting diode ("LED" for short) component is used as the primary radiation source. These devices offer the advantage of high light output together with compact construction and low weight.

In a further embodiment of the inventive method, at least two light guides are used and are advantageously connected in adjacent edge regions by means of an optical coupling medium. Suitable for use as the optical coupling medium are materials having similar optical properties to the material of the light guide. In this way, radiation can pass from one light guide into the adjacent one with as little hindrance as possible, thus improving the radiation characteristic of the surface illumination system. If the edge regions of adjacent light guides are potted or glued, this can further contribute to the mechanical stability of the surface illumination system.

In a further preferred embodiment of the method, at least one radiation transparent film is applied to the radiation emitting front side of the light guide. This also helps to improve the mechanical stability of the light guide combination.

Furthermore, an optically active film that influences the radiation characteristic of the surface illumination system in a desired manner is preferably applied. For instance, the optically active film can have on its surface prism-shaped structures such that light incident on the back side is deflected toward the surface normals of the radiation emitting front side.

A surface illumination system according to the invention comprises in particular:
- at least one primary radiation source suitable for emitting electromagnetic radiation when operating,
- at least one flexible carrier comprising a front side and a back side opposite the front side, and comprising at least one mounting area on the front side of which the primary radiation source is mounted, it being the case that the front side of the flexible carrier except for the mounting area defines a reference plane and the mounting area is bent out of the reference plane, such that an optical axis of the primary radiation source extends parallel or obliquely at an acute angle to the reference plane,
- a rigid carrier on which the flexible carrier is mounted so that the back side of the flexible carrier points in the direction of the rigid carrier, and
- at least one light guide having a radiation emitting front side and at least one incoupling region, and which is mounted on the flexible carrier such that when the surface illumination system is operating, the primary radiation source emits radiation into the incoupling region of the light guide and the radiation emitting front side of the light guide points in the direction of the radiation emitting front side of the surface illumination system.

The surface illumination system preferably has a flexible printed circuit board as its carrier and a light-emitting diode component as its primary radiation source.

Furthermore, the flexible carrier of the surface illumination system also preferably includes electronic components, conductive traces and/or cooling bodies.

If the surface illumination system comprises at least two light guides, then adjacent edge regions of the light guides are particularly preferably connected to an optical coupling medium.

In a further preferred embodiment of the surface illumination system, the radiation emitting front side preferably comprises a radiation-transparent film.

Further advantages and advantageous embodiments of the method of assembling the surface illumination system will emerge from the exemplary embodiments explained in more detail hereinbelow in conjunction with FIGS. 1a to 1b, 2a to 2e, 3a to 3b and 4a to 4b.

DETAILED DESCRIPTION OF THE PREFERRED EMBODIMENTS

In the exemplary embodiments and figures, elements of the same kind or identically acting elements are provided with the same respective reference numerals. The illustrated elements in the figures should not be considered true to scale. Rather, they may be depicted as exaggeratedly large to provide a better understanding.

According to a first exemplary embodiment (see FIG. 1a) of the method, primary radiation sources 2, for example LEDs, are attached in a row to the edge of a flexible printed circuit board 1 and are electrically contacted by means of electrical conductive traces. In addition, further electronic components 3, such as for example driver modules for driving the LEDs 2, are attached to the flexible printed circuit board 1 and connection sites 31 for electrical contacting are formed laterally. Cooling bodies 4 (see FIG. 1b) are mounted on the side of the flexible printed circuit board 1 opposite from the LEDs 2, to dissipate the waste heat developed when the LEDs 2 are in operation. In a subsequent step of the method, plural flexible printed circuit boards 1 equipped in this fashion are mounted on a rigid carrier 5 (see FIG. 2a).

Figure 1A:
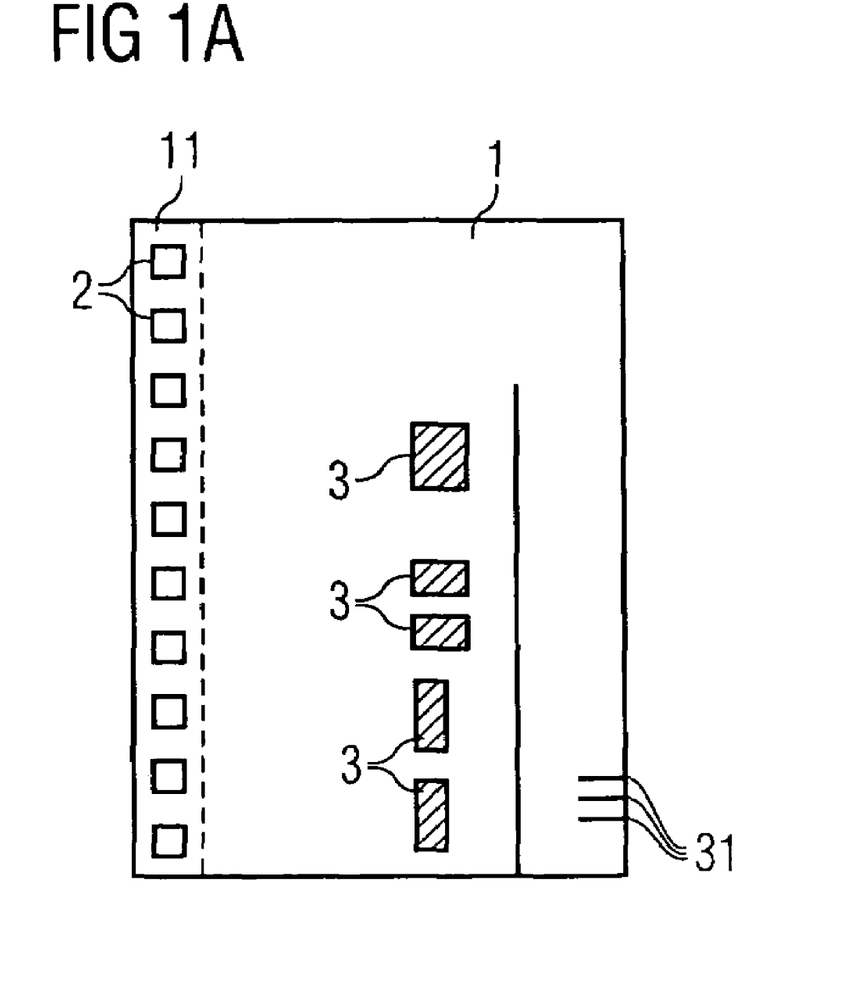
FIG. 1a is a schematic plan view of a flexible printed circuit board comprising primary radiation sources, electronic components and lateral connection sites, prior to the bending of the mounting areas.
Figure 1B:
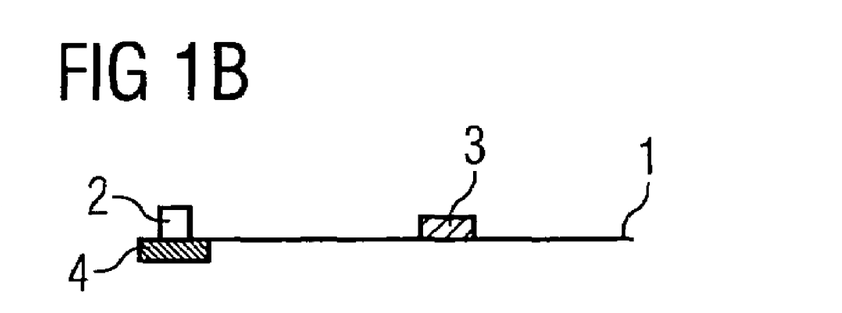
FIG. 1b is a schematic sectional view through the flexible printed circuit board of FIG. 1a, FIG. 2a is a schematic plan view of several flexible printed circuit boards as in FIG. 1a, mounted on a rigid carrier.
Figure 2A:
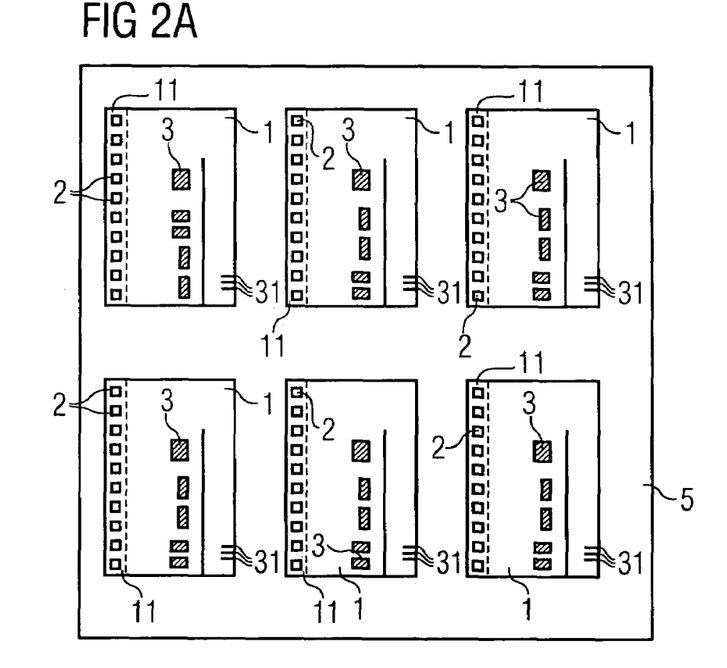
Figure 2B:
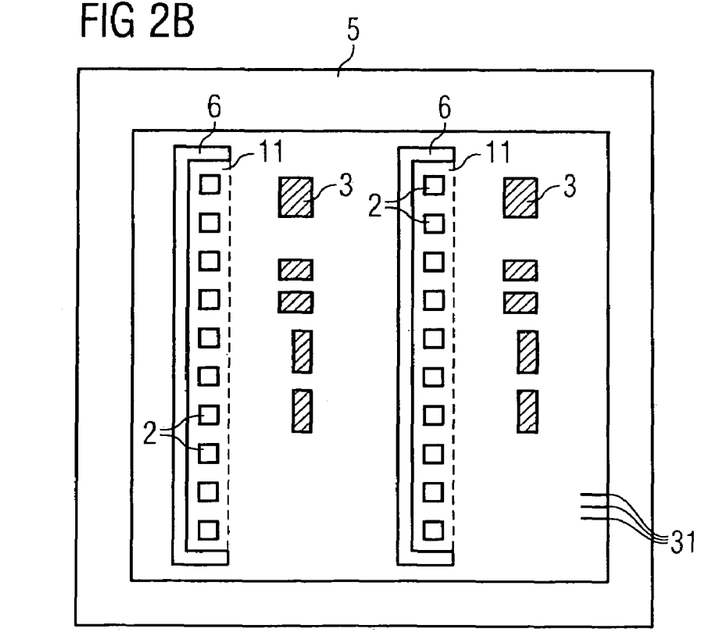
FIG. 2b is a schematic plan view of a flexible printed circuit board on a rigid carrier.
Figure 2C:
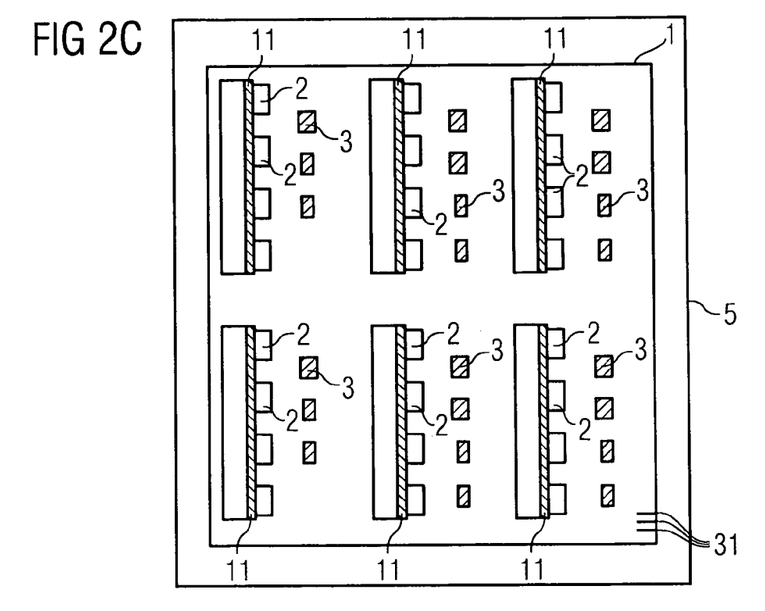
FIG. 2c is a schematic plan view of the flexible printed circuit board of FIG. 2b after the bending of the mounting areas.
Figure 2D:
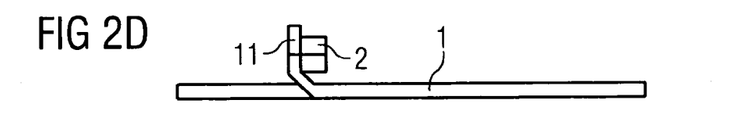
FIG. 2d is a schematic sectional view through a region of the flexible printed circuit board of FIG. 2c.
Figure 2E:
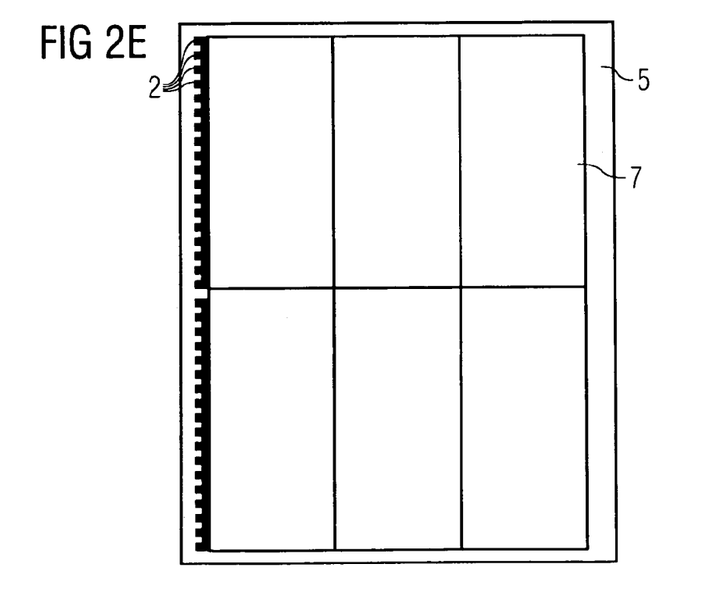
FIG. 2e is a schematic plan view of a surface illumination system comprising a flexible carrier according to FIG. 2c or 2a after the placement of plural light guides.

In a second exemplary embodiment, slits 6 are formed in a flexible printed circuit board 1 such that a narrow rectangular mounting area 11 is formed by a respective three continuous slits 6 and remains connected on one side to the rest of the flexible printed circuit board 1 (see FIG. 2b). Plural LEDs 2 are again mounted in a row within each of these mounting areas 11. As in the exemplary embodiment described hereinabove in connection with FIGS. 1a and 1b, electronic components 3 are additionally disposed on the flexible printed circuit board 1. In a subsequent method step, the narrow rectangular mounting areas 11 on which the LEDs 2 are disposed are bent upward so that later on, during operation, the LEDs 2 will be in the desired position to in couple radiation into a light guide 7 which is subsequently put in place. The narrow rectangular regions 11 can for example be bent upward in such a way that they are oriented substantially perpendicularly to the rest of the flexible printed circuit board 1, as can be seen in FIGS. 2c and 2d. Here again, in this embodiment the flexible printed circuit board 1 is mounted on a rigid carrier 5, such as for example a display back wall.

Figure 4A:
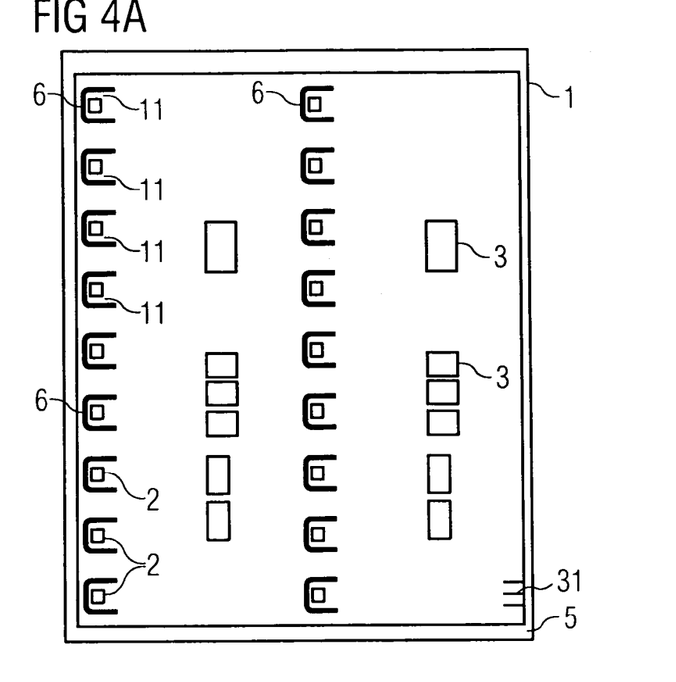
Figure 4B:
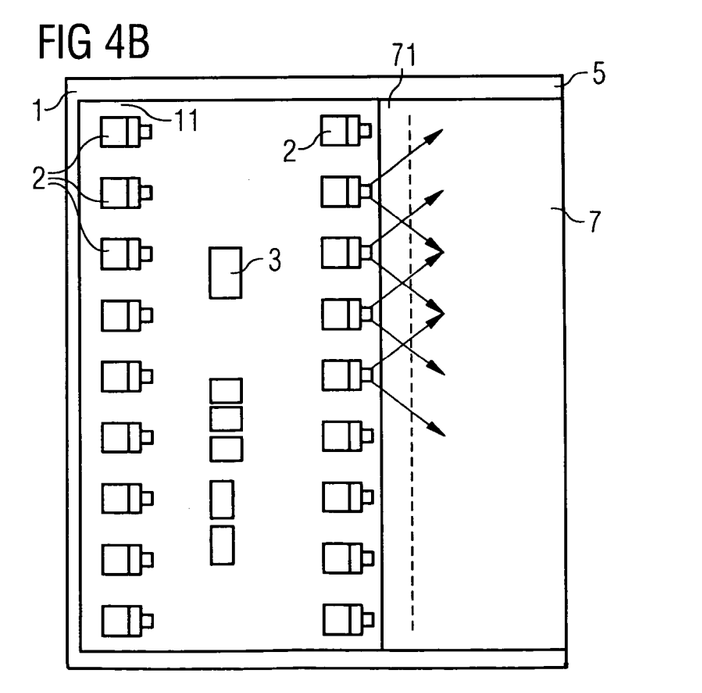

In a further exemplary embodiment, the slits 6 are made in the flexible printed circuit board in such a way as to produce rectangular mounting areas 11 in each of which only one LED 2 is mounted (see FIGS. 4a and 4b).

In another subsequent step, light guides 7 are placed on the partially bent printed circuit board 1 equipped with the LEDs 2. This is done in such a way that in operation, the LEDs 2 each emit radiation into a respective incoupling region 71 of a light guide 7 and a radiation emitting front side 72 of the light guide 7 points away from the flexible printed circuit board 1 (see FIG. 2e).

In a further exemplary embodiment (see FIGS. 3a and 3b), formed on the rigid carrier 5 are bracing elements 51 which bend the mounting areas 11 of the flexible printed circuit board 1, on which the LEDs 2 are disposed when flexible printed circuit board 1 is placed on rigid carrier 5, into the desired position and hold it there. These straps 51 can for example be straps 51 bent out of the reference plane of the rigid carrier 5. Vertically bent straps 51 have the advantage that the angle between the bent region 11 of the flexible printed circuit board 1 and the rest of the flexible printed circuit board 1, and thus the angle of incidence of the LED 2 into the light guide 7, can easily be varied. In addition, the straps 51 can be shaped so that the flexible printed circuit board can be attached to them.

Figure 3A:
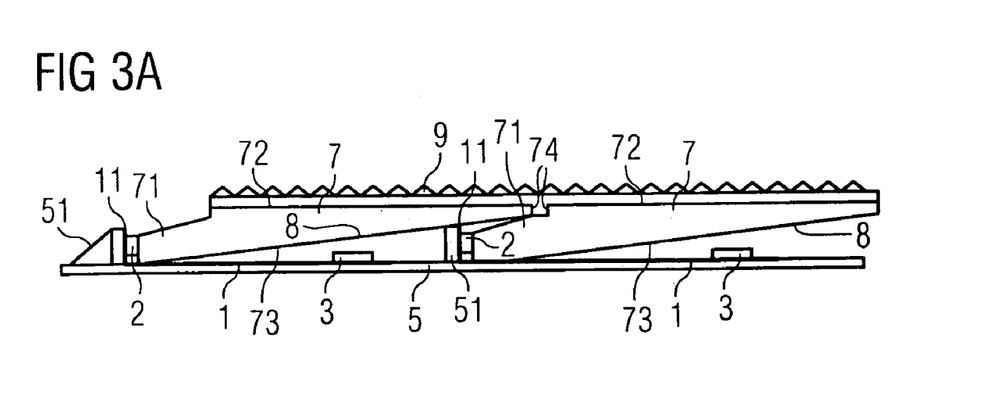
FIGS. 3a and 3b are schematic sectional views through two variants of a surface illumination system according to FIG. 2e, FIGS. 4a and 4b are schematic plan views of further exemplary embodiments of the flexible printed circuit board.
Figure 3B:
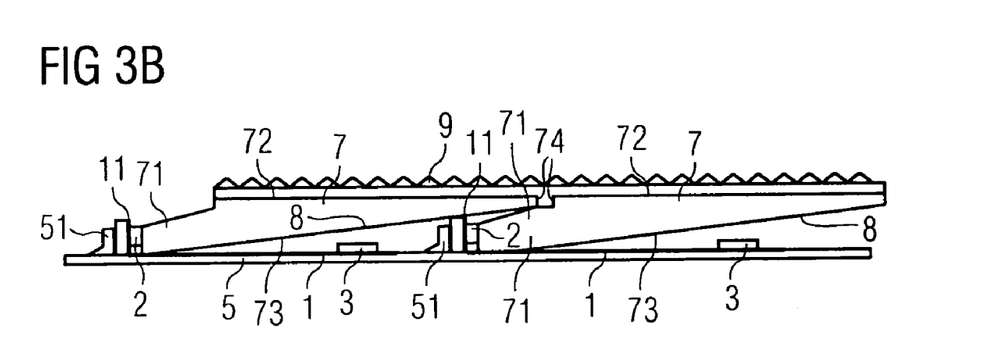

Furthermore, in this exemplary embodiment, diffusely reflecting elements 8, such as for example diffusely reflecting films or diffusely reflecting structures, are formed on the back side 73 of the light guide 7, i.e. the side facing away from the radiation emitting front side 72.

In the exemplary embodiment according to FIGS. 3a and 3b, the edges of the light guides 74 are glued or potted. Particularly suitable for use as potting compounds or glues are radiation transparent materials, preferably having a similar refractive index to the material of the light guide 7. Epoxy systems, for example, can be used as glues.

In a further exemplary embodiment, one or more films that are virtually transparent to the radiation emitted by the surface illumination system are applied to the front side 72 of the light guide 7.

This film is preferably an optically active film 9, which for example bears prism-shaped structures on its surface and thereby purposefully influences the extraction characteristic of the surface illumination system in a desired manner.

The invention naturally is not limited to the exemplary embodiments, but encompasses all variant embodiments of surface illumination systems and methods of assembling such a system comprising a flexible carrier for the primary radiation sources, in which mounting areas on which the radiation sources are disposed are bent out of a main plane of extension of the flexible carrier in order to bring the radiation sources into the desired position relative to the light guide.

The invention claimed is:

1. A method of assembling a surface illumination system having an electromagnetic radiation emitting front side, the method comprising
   mounting at least one primary radiation source, suitable for emitting electromagnetic radiation when operating, on at least one mounting area of a flexible carrier having a front side and a back side opposite said front side, said front side of said flexible carrier defines a reference plane,
   bending said mounting area of said flexible carrier out of said reference plane such that an optical axis of said primary radiation source extends parallel or obliquely to said reference plane,
   mounting said flexible carrier on a rigid carrier with the back side of said flexible carrier facing said rigid carrier, and
   mounting at least one light-conducting guide having a radiation emitting front side and at least one incoupling region on said flexible carrier such that when said surface illumination system is operating, said primary radiation source emits radiation into the incoupling region of said light guide and the radiation emitting front side of said light guide points in the direction of the radiation emitting front side of said surface illumination system;
   wherein rigid structures are disposed on said rigid carrier for use in bending said mounting area of said flexible carrier out of said reference plane into a desired position when said flexible carrier is placed on said rigid carrier.

2. The method as in claim 1, wherein said light guide is mounted on said flexible carrier after said flexible carrier has been mounted on said rigid carrier.

3. The method as in claim 1, wherein said light guide is mounted on said flexible carrier before said flexible carrier is mounted on said rigid carrier.

4. The method as in claim 1, wherein electronic components, conductive traces and/or cooling bodies are mounted on said flexible carrier.

5. The method as in claim 1, wherein a flexible printed circuit board is used as said flexible carrier.

6. The method as in claim 1, wherein
   at least one mounting area is deliberately created by making slits in said flexible carrier,
   said primary radiation source is mounted in said mounting area, and
   said mounting area is bent out of said reference plane.

7. The method as in claim 6, wherein said slits are made by punching.

8. The method as in claim 1, wherein said primary radiation source is a light-emitting diode component.

9. The method as in claim 1, wherein at least two light guides are used and adjacent edge regions of said light guides are connected to each other by means of an optical coupling medium.

10. The method as in claim 1, wherein at least one radiation-transparent film is applied to said radiation emitting front side of said light guide.

11. A surface illumination system having a radiation emitting front side, the surface illumination system comprising:
at least one primary radiation source suitable for emitting electromagnetic radiation when operating,
a rigid carrier with rigid structures,
at least one flexible carrier comprising a front side and a back side opposite said front side, and comprising at least one mounting area on the front side of which said primary radiation source is mounted, wherein the flexible carrier is mounted to the rigid carrier so that the back side of said flexible carrier points in the direction of said rigid carrier, the front side of said flexible carrier, except for said mounting area, defines a reference plane and said mounting area is bent out of said reference plane in a position fixed by the rigid structures of the rigid carrier such that an optical axis of said primary radiation source extends parallel or obliquely to said reference plane,
at least one light guide having a radiation emitting front side and at least one incoupling region, and which is mounted on said flexible carrier such that when said surface illumination system is operating, said primary radiation source emits radiation into the incoupling region of said light guide and the radiation emitting front side of said light guide points in the direction of the radiation emitting front side of said surface illumination system.

12. The surface illumination system as in claim 11, comprising at least one radiation-transparent film on its radiation emitting front side.

13. The surface illumination system as in claim 11, wherein the flexible carrier includes a flexible printed circuit board.

14. The surface illumination system as in claim 11, wherein the primary radiation source includes a light-emitting diode component.

15. The surface illumination system as in claim 11, comprising electronic components, conductive traces and/or cooling bodies mounted on said flexible carrier.

16. The surface illumination system as in claim 11, comprising at least two light guides which are connected in adjacent edge regions by means of an optical coupling medium.

17. The surface illumination system as in claim 11, wherein the rigid structures are straps bent out of a reference plane of the rigid carrier.

18. The method as in claim 1, wherein the rigid structures are straps bent out of a reference plane of the rigid carrier.

* * * * *